April 14, 1959 P. W. KLOOZ 2,881,452
APPARATUS FOR TRIMMING SEQUENTIALLY THE OPPOSITE
ENDS OF AN ELONGATED WORKPIECE
Filed Nov. 26, 1952 4 Sheets-Sheet 2

INVENTOR.
PAUL W. KLOOZ
BY
Lindsey and Prutzman
ATTORNEYS

April 14, 1959 P. W. KLOOZ 2,881,452
APPARATUS FOR TRIMMING SEQUENTIALLY THE OPPOSITE
ENDS OF AN ELONGATED WORKPIECE
Filed Nov. 26, 1952 4 Sheets-Sheet 4

INVENTOR.
PAUL W. KLOOZ
BY
Lindsey and Prutzman
ATTORNEYS

United States Patent Office 2,881,452
Patented Apr. 14, 1959

2,881,452

APPARATUS FOR TRIMMING SEQUENTIALLY THE OPPOSITE ENDS OF AN ELONGATED WORKPIECE

Paul W. Klooz, West Hartford, Conn., assignor to The Holo-Krome Screw Corporation, Elmwood, Conn., a corporation of Connecticut Application November 26, 1952, Serial No. 322,683

7 Claims. (Cl. 10—9)

This invention relates generally to machine tools of the type for performing trimming, chamfering, shaving, skiving, and similar operations on work pieces such as slugs and like pieces of stock. The invention is particularly concerned with a machine tool suitable for machining both ends of a work piece in a completely automatic operation.

The machine of the present invention has particular utility but is not limited to usefulness in the art of manufacturing socket head screws. As is well-known, it is the standard practice in this art to cut cylindrical slugs of desired length from rod stock which slugs are then formed with a socket in one end and frequently with a depression or projection on the other end. Following the forming operation just referred to, it is necessary to trim both ends of the slug to provide the desired finished end surfaces. Heretofore, the trimming of the ends has been generally practiced as a step by step operation. In other words, the slugs are first run through a machine which operates to trim one end of the slug and then the slugs are separated from the trimmings and run through a second machine to trim the other end. Not only does this require repeated handling of the slugs and including the separating step referred to, but in addition the procedure is relatively slow and costly since an output of only fifty to sixty per minute at each trimming stage is considered to be about as good as can be accommplished commercially.

The principal object of the present invention is to provide a single machine which will trim both ends of a slug or work piece in an automatic sequence of operation so that all that the operator has to do is to place the slugs or work pieces into a receiver or hopper at one side and receive the slugs finished on both ends at the other side, preferably separate from the trimmings.

Another object of the invention is to provide such a machine which will operate effectively at high speed so that the rate of output of finished screws or the like can be greatly increased.

A still further object is to provide apparatus of the foregoing character which will conveniently accommodate various sizes of articles, including relatively small articles, and which is capable of making various types and sizes of cuts or trims thereon as desired.

Another object of the invention is to provide a machine that will not only effect double ended cutting operations very efficiently, but which will also assure segregation of the partially fabricated slugs from the shavings or chips that have been removed.

Yet another object of the invention is to provide a machine which is of low cost, which requires little operational attention, which is rugged, and which will entail little maintenance.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

While the invention is susceptible to a number of practical uses, nevertheless for convenience of presentation, the embodiment of the invention which is shown in the drawing is one specifically designed for trimming socket head screws, and therefore the ensuing description will be restricted to certain manufacturing operations employed in this art. As mentioned above, in the making of socket head screws, cylindrical slugs or work pieces are customarily cut from a rod of indeterminate length, these slugs then being individually subjected to a forging operation to form the hexagonal socket at one end thereof, and, if desired, an indentation of conical or other form in the other end. After the forming of ends including the socket which is subsequently to be used in tightening and loosening the screw, it is necessary to trim both ends of each slug. Very frequently it is desired to have both ends chamfered or beveled, this being necessary before the threading operation is performed on the slug and which threading operation completes the fabrication of the screw. It is with the end trimming of the slugs that the ensuing description will deal, and with the foregoing basic understanding of what is desired, it is throught that the merits of the invention may be better appreciated from the outset.

Referring to the drawings, the machine includes a frame A on which is mounted a work loader B for the purpose of successively conveying each slug or work piece as it is received from a feed tube into registry with the first of two spindle collets C, C'. These spindle collets are arranged in a spaced, generally parallel relation with each other, and are operated in unison to grip simultaneously two slugs at different ends thereof in order that a trimming operation may be performed on one end of one slug while another trimming operation is being performed on the other end of the other slug. There is a transfer carrier D, performing a dual function in transferring the successive slugs from the collet C to the collet C' and also from the collet C' to a point of discharge. The carrier D includes a pivotal or swivel arm which performs the second function which results in the reversal of position of each slug as it is carried from the first collet C to the second one C'. While the carrier D actually moves the slugs transversely relative to the collets C, C', it will be recognized that once the slugs have been brought into registry with the collets C, C', the work loader B producing registry of the various slugs with the collet C and the transfer carrier D producing registry with the collet C', it is necessary to inject the slugs into the collets and this is done by means of pushing mechanisms E, E', such mechanisms being mounted axially with the collets so that the slugs can be shoved from the loader B and the carrier D into the collets C, C'. The slugs are later ejected from the collets by a spring actuated ejector forming a part of each collet, these ejectors being compressed by the action of the pushers E, E' during the injection step. However, before the slugs are ejected, a trimming operation is performed on their exposed or free ends by a pair of cutters F, F' consisting of pivotally mounted tool holders and tools. In order to assure the proper programming of the aforesaid mechanisms without interference from each other, a cam shaft G with appropriately contoured cams thereon is employed. From the foregoing grouping of mechanisms and brief explanation of each, it is thought that a general understanding of the invention will now have been provided, and that a full comprehension of the invention will be made possible by a study of the following more detailed description.

Describing first the work loader B, this loader includes a lever arm 10 which is connected at one end to a rockshaft 11 and which carries at its other end a relatively rigid jaw member 12 which is rendered pivotal by virtue of a pivot pin 13. By reason of the jaw member 12 being supported in a pivotal fashion, the jaw member may be adjusted for the proper coaction with other parts subsequently to be described. The adjustment is effected by means of a leaf spring 14 biasing the member 12 in a counterclockwise direction; the biasing action of the spring 14 is opposed by an adjusting screw 15, retraction of which permits the jaw member 12 to be moved upwardly or in a counterclockwise direction as viewed in Figure 6. Cooperating with the jaw member 12 is a second jaw member in the form of a resilient leaf spring 16 having one end thereof anchored to the member 12 at 17 and provided at its free end with an offset 19 for a purpose presently to be described. A cylindrical slug 20, one of a series, is shown in Figure 6 as it is being received between the jaw members 12 and 16.

Figure 1:
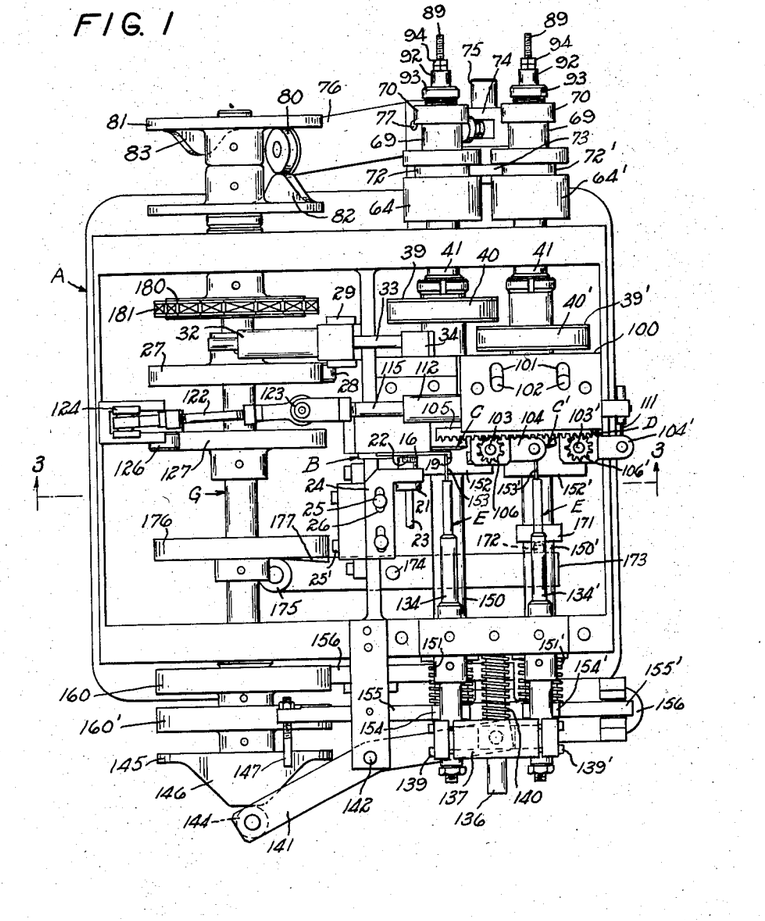
Figure 1 is a plan view of an embodiment of the apparatus of the present invention.
Figure 6:
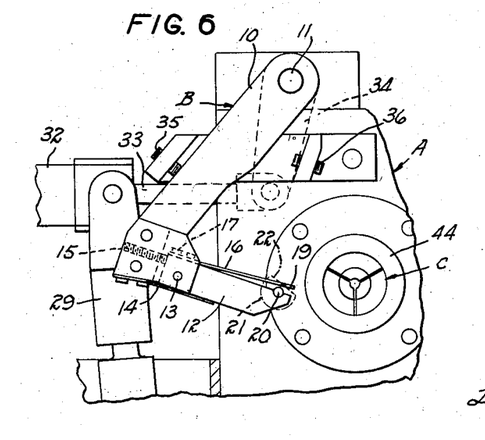
Figure 6 is a fragmentary view corresponding most closely to Figure 3, but instead depicting the loader arm in a loading position.

As best seen in Figure 1, although a projected reflection is shown in phantom outline in Figure 6, there is a bushing 21 provided with an inclined flat 22, the bushing being situated at the exit end of a feed tube 23, such feed tube serving to gravitationally carry the series of slugs mentioned in the preceding paragraph one of which has already been designated by the numeral 20. To adjust the bushing 21 both horizontally and vertically, a bracket 24 is mounted on a portion of the frame A, the adjustment being made possible by virtue of bolts 25, 25' and horizontally and vertically arranged slots 26 (only the horizontal slots may be seen).

Coming now to the description of the mechanism for actuating the rockshaft 11 and which mechanism is a part of the work loader B, a peripheral cam 27 is fixed to the cam shaft G and in engagement with the cam is a follower 28 carried at one end of a follower arm 29, the arm being pivotally mounted to the frame A at 30. In order to assure contact between the follower 28 and the cam 27, there is employed a contractile spring 31 which is anchored to both the arm 29 and the frame. A spring-loaded drive cylinder 32 serves as a buffer for the follower arm 29, such buffer being very similar to the cylinder shown in Figure 5 and which cylinder will be described in considerable detail when the transfer carrier D is explained. In order to transmit the motion from the loader cam 27 to the rockshaft 11, there is utilized a connecting link 33 having pivotal connection at one end to the upper end of the follower arm 29 and at its other end to a crank 34 on the rockshaft.

To limit the oscillatory swing of the lever arm 10, a pair of limit screws 35 and 36 are threadedly mounted on a portion of the frame A. The cylinder 32, of course, prevents damage to the work loader mechanism when less than the maximum possible amount of travel of the arm 10 is desired, for once the arm 10 has come into abutting contact with either of the limit screws 35 or 36, the spring within the cylinder 32 will absorb any additional force that might be produced by the cam 27 and its follower arm 29; however, as hereinbefore indicated, the exact functioning of the spring arm loader 32 will be better understood when specific reference will be made to the structural details portrayed in Figure 5.

In describing the collet type chucks C, C', it will be seen from Figure 1 that a pair of sheaves 39, 39' is employed for rotating these two collets, belts 40, 40' serving to conduct the rotating force to these sheaves from a drive motor which is not shown. Inasmuch as the collets C and C' are identical with the exception of the particular longitudinal disposition of the sheaves 39, 39', staggered for the sake of compactness, only one collet need be referred to in detail; and, for this reason, particular reference should now be had to Figure 4 in which there is shown a sleeve 41 on which the sheave 39' is keyed.

At one end of the sleeve 41 is a pair of bearings 42 which, of course, function to rotatably support this end of the sleeve; also adjacent this end of the sleeve is a pair of bearing seals 43. The extreme end of the sleeve 41 is provided with a collet cap 44 having a bevelled aperture 45. A collet sleeve 46 is axially disposed within the sleeve 41 and is equipped with obtusely tapered gripping fingers 47, the gripping fingers having thereon inclined faces 49 and 50. Interposed between the collet sleeve 46 and the outer sleeve 41 is a finger actuating sleeve 51 which is terminally provided with internally tapered face 52 at its forward end. The bevelled aperture 45 and the inclined face 47 are complemental relative to each other and similarly the inclined face 50 is complemental with the internally tapered face 52 of the finger actuating sleeve 51. In this way, the gripping fingers 47 are urged into clamping relationship when the actuating sleeve 51 is moved to the left as viewed in Figure 4.

A retainer, generally designated by the numeral 53, serves to hold the various parts of the spindle collet thus far described in an operable axial relationship. The bearings 42, as previously indicated, support the left-hand or forward end of the sleeve 41 and a bearing 54 journals the other end of this sleeve. To the right of the bearing 54 is circumferentially disposed a longitudinal movable collar 55. A plurality of angularly spaced pins 56 which are carried by the collar 55, extend radially inward to engage a corresponding number of slots 57 formed in a power transfer sleeve 58, the inner ends of these pins being engageable with either end of the relatively small slots 57. Of course, in order to obviate any interference between transfer of movement from the collar 55 to the transfer sleeve 58, a similar number of slots 59 is disposed in the sleeve 41, these slots being sufficiently long to provide clearance so that the pins do not contact the ends thereof during their normal travel in either direction. A reaction ring 60 is made fast with the sleeve 41, and, by virtue of a tapered face 61 on the collar 55 and a complementally tapered face on the reaction ring, a tapered groove is formed in which are positioned a series of balls 63. These balls are designed to urge the collar 55 to the left as will be seen in Figure 4. In order to accomplish such movement, a pair of shiftable collars 64, 64' is associated with the collets C, C', these collars having a bore 65 through which the sleeve extends and which bore communicates with an enlarged counterbore 66, the counterbore being tapered at 67 in order to urge the balls inwardly to effect the desired movement of the collar 55 to the left as previously mentioned, reference still being had to Figure 4. In effect the collars 64, 64' are cages or retainers for the balls 63.

Figure 4:
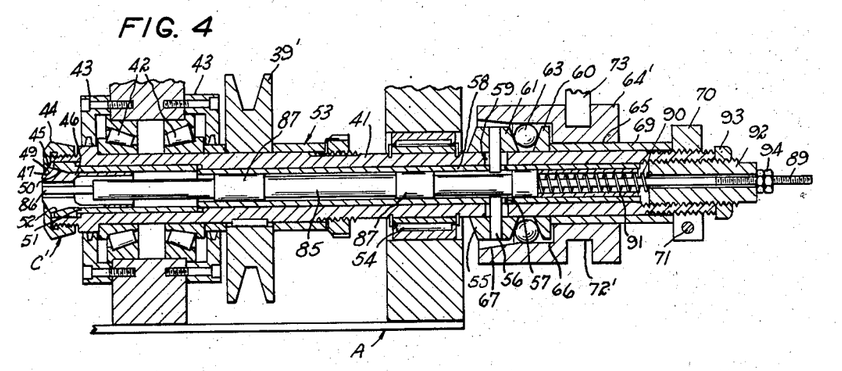
Figure 4 is a sectional view taken in the direction of line 4—4 of Figure 7.

As indicated in the preceding paragraph, the ring 60 is made fast relative to the sleeve 41, and since it need be only movable in one direction, because it is to absorb the reactive force of the balls 63, the spacer sleeve 69 assures that the ring will be kept immobile, for a split nut 70 is threaded on the right end of the sleeve 41 to prevent any movement of the spacer sleeve 69 in this direction. A clamping screw 71 assures that the split nut 70 will remain in any desired axial position into which it has been moved.

Figure 7:
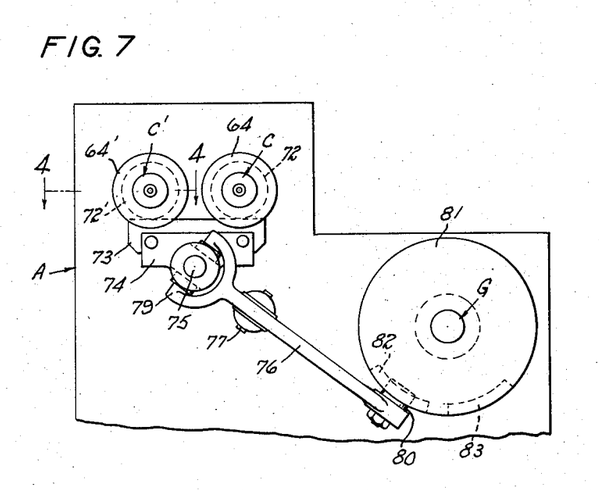
Figure 7 is a rear view of the apparatus.
Figure 8:
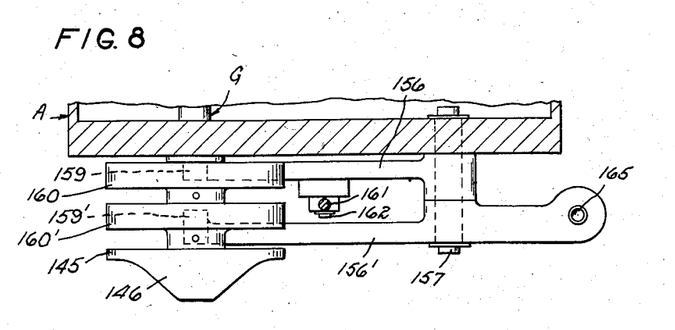
Figure 8 is a sectional view taken in the direction of line 8—8 of Figure 2.

The collars 64, 64', actuating members for the balls 63, are both shown in Figure 1; and, from a reference to this figure taken in conjunction with Figure 4, which shows only the collar 64', it will be observed that both collars are provided with circumferential grooves 72, 72' into which extends a drive key 73. The drive key is of sufficient length to engage both grooves 72, 72', and in order to assure unitary movement of the two actuating collars 64, 64', the drive key 73 is carried on a crosshead 74 which is mounted for slidable movement on a guide bar 75 (Figure 7). Extending angularly relative to the crosshead 74 is an inclined follower arm 76 pivoted intermediate its ends at 77 and having a knuckle joint connection 79 with the crosshead 74. At the opposite end from the knuckle joint 79 is carried a cam follower 80 which is engageable with what may be generally termed a cylindrical cam 81 having a promontory 82 projecting in one direction and a promontory 83 extending in the opposite direction. In this way, the promontory 82 will move the actuating collars 64, 64' in such a direction as to obtain tightening or closing of the spindle collets C, C' whereas the promontory 83 will permit the release or opening of the spindle collets.

Contained within each collet C, C' and constituting a part thereof is a plunger, the one in the collet C' bearing the reference numeral 85 (Figure 4). The plunger 85 is equipped with an ejector tip 86 of reduced cross section and several integral collars 87 of enlarged cross section which act as bearings for the plunger as it is slid back and forth. At the rear or right-hand end of the plunger 85 is an extension rod 89 about which encircles a compression spring 90. Encircling the spring 90 is a limit sleeve 91 which determines the amount of travel that the plunger 85 can make when moved toward the right for an adjustable stop 92 is threaded within the rear end of the sleeve 41, said adjustable stop being held in place by a lock nut 93. A pair of lock nuts 94 is employed for determining the forward or left-hand amount of travel of the plunger 85.

Coming now to a description of the transfer carrier D, such transfer mechanism includes a base plate 100 provided with a pair of slots 101 through which extend a pair of screws 102. In this way, the base plate is adjustable and those parts carried thereupon, presently to be mentioned, are likewise movable into proper juxtaposition with the parts with which they coact. Also included as part of the transfer carrier D is a pair of rockshafts 103, 103', these rockshafts being vertically arranged and carrying lever arms 104, 104'. To produce a desired rocking action of the lever arms 104, 104', a rack 105 is employed which meshes with a pair of pinions 106, 106' on the rockshafts 103, 103'. Carried by the lever arms 104, 104' are two pairs of tongs or fingers 107, 107' which are designed to resiliently grip the various slugs or work pieces 20, there being a spring 109 and a ball 110 which are coactable to produce the desired resilient gripping action. The spring 109 and the ball 110 are shown only in Figure 3, a portion of the lever arm 104' being removed to show this construction. The pair of tongs 107' is cooperable with a fixed ejector element 111 (Figure 1) to cause the ultimate discharge of each slug after the second or final cutting operation has been consummated.

Figure 5:
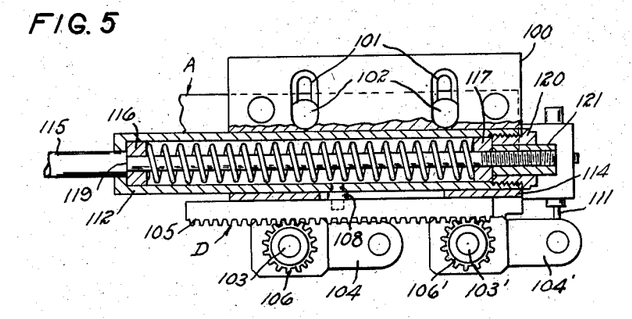
Figure 5 is a view, partly in section, taken in the direction of line 5—5 of Figure 3, said line 5—5 being somewhat irregular in its direction to best show the details of the buffer cylinder.

In order to yieldably drive the lever arms 104, 104' in prescribed identical, oscillatory patterns, a spring-loaded drive cylinder or buffer 112 is employed, such cylinder being best understood from an inspection of Figure 5. Incidentally, the drive cylinder 112 is similar to the drive cylinder 32 previously mentioned, and, as was stated at the time that the cylinder 32 was referred to, the detailed description of the cylinder 112 is intended to clarify the operation of the earlier mentioned cylinder. The cylinder 112 has a connecting pin 108 which is in engagement with the rack 105 and serves to transmit the driving force from the cylinder to said rack. Rendering the cylinder 112 movable relative to the base plate 100 is a cylinder housing 114, the cylinder housing being affixed to the base plate and loosely encircling said cylinder. Movable within the cylinder 112 is one end of a piston rod 115 having loosely circumscribed thereabout a pair of washers or piston members 116 and 117. By virtue of a shoulder 119 on the piston rod 115, the washer 116 is moved with the piston rod 115 when said rod is urged toward the right as viewed in Figure 5. At the opposite end of the cylinder 112 from the end associated with the shoulder 119 is a threaded bushing 120 which provides a stop for the other washer 117. Slidable within the bushing 120 is a sleeve bearing 121 supporting the extreme end of the piston rod 115 for said sleeve bearing is threaded on the rod but is free to move relative to the bushing 120. A connecting linkage 122 having included thereon a knuckle joint 123 serves to connect the left end of the piston rod 115 with a follower arm 124, the follower arm being pivotally mounted to the frame A at 125 and having at its lower end a follower 126. The follower 126 is engageable with a periphery cam 127 and is held in contact with said cam by means of a spring 129. The cam 127 is, of course, contoured to produce the desired oscillatory movement of the lever arms 104, 104', which oscillatory movement will be better understood when the operation of the apparatus is described.

In order to inject the various slugs 20 into the collets C, C', the pushers E, E' are utilized and these pushers comprise plungers 134, 134' having reduced ends 135, 135', the ends 135, 135' being engageable with the ends of the slugs 20 to introduce them into the collets. A stationary guide bar 136 extends forwardly from the frame A and is adapted to slidably carry a yoke 137, the yoke having screws 139, 139' for tightening same against the plungers 134, 134'; in this way, any movement of the yoke 137 is transmitted directly to the plungers 134, 134'. Biasing the yoke 137 forwardly, and consequentially the plungers 134, 134', is a compression spring 140. The action of the spring 140, however, is overcome by means of a follower arm 141 having a pivot 142 intermediate its ends. One end of the follower arm is connected to the yoke 137 and the other end carries a follower 144 engageable with an end cam 145, the end cam having a promontory 146 for actuating the follower arm and in turn actuating the yoke and plungers connected thereto. To establish an initial or normal position of the arm 141 is a limit stop 147 against which said arm is urged by the spring 140 when the promontory 146 is not in contact with the follower 144.

Turning now to an explanation of the cutters F, F', it will be seen that these cutters involve the use of a pair of rockshafts 150, 150' having springs 151, 151' encircling and biasing the shafts in a clockwise direction. Also, as will presently be clarified, the springs 151, 151' serve to urge the rockshafts away from the collets C, C'. The rockshafts 150, 150' carry two holders 152, 152' in which are retained tools or bits 153, 153', these tools or bits being designed to produce bevels on each end of the slugs 20. For transferring motion to the tool holders 152, 152' which are fast relative to the rockshafts 150, 150', a pair of clamp blocks 154, 154' are clamped to these rockshafts, the clamping blocks carrying lever arms 155, 155'. Instrumental in transmitting motion to the lever arms 155, 155' is a pair of follower arms 156, 156' having a common pivot 157. The adjacent ends of the follower arms 156, 156' are equipped with followers 159, 159' which engage peripheral cutter cams 160, 160'.

Figure 2:
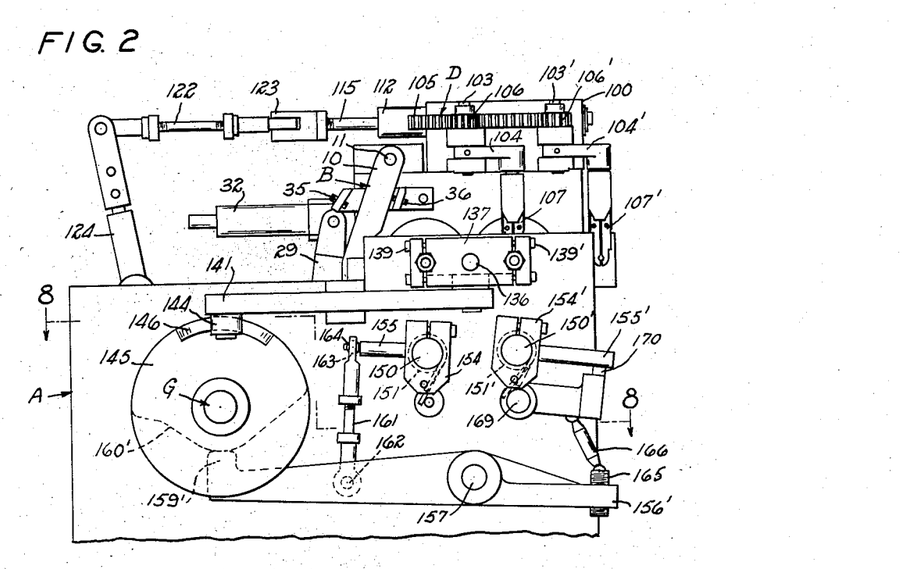
Figure 2 is a front view with the lower or pedestal part of the framework removed.

In order to transmit motion from the follower arm 156 to the lever arm 155, there is an extensible link 161, the link being pivotally connected to the arm 156 at 162 and having a socket 163 which provides a universal connection with a ball 164 integral with the lever arm 155. The motion from the follower arm 156', on the other hand, is transmitted to the lever arm 155' in somewhat a different manner; and, as will be seen from Figure 2, a socket screw 165 is threadedly carried at the end of the arm opposite from its follower, the socket screw being in engagement with a link member 166 which is equipped with a ball head at each end thereof. The upper ball head of the link 166 engages the underside of a lifting lever 167 which lever is pivoted about a fixed shaft at 169. Positioned on the lifting lever 167 is a bearing element 170 providing a sliding relationship between the lever 167 and the lever arm 155' so that said arm will ride thereover without interference and of course be pivotally actuated by the element 170.

While it is quite easily seen how equal bevelled cuts or trims could be made with the cutters F, F', it is thought rather unobvious as to just how unequal cuts or trims might be effected. Therefore, a detailed description explaining this feature will now be presented. As shown in Figure 1, the rockshaft 150' is provided with a collar 171 fixed thereto and cooperable with said collar is a bearing pin 172 projecting from a follower arm 173 which follower arm is pivoted at 174 and which has a follower 175 engageable with an end cam 176. The end cam 176 is provided with a promontory 177 projecting from one face of the end cam sufficiently to cause the follower arm to move the bearing pin 172 against the collar 171. As hereinbefore stated, the tension springs 151, 151' urge the rockshafts 150, 150' frontwardly or away from the collets C, C' (actually only the action of the spring 151' is herein necessary) and the action of the follower arm 173 merely acts to overcome the spring tension imposed upon the rockshaft 150'. Of couse, the follower arm 173 comes into play only at the desired time to assure that the appropriate depth of cut will be made, the angular position of the promontory 177 assuring this. This feature is well suited for making dog screws and will be better understood when the entire operation of the apparatus is dealt with.

The cam shaft G which has affixed thereto the aforesaid cams is rotated by a sprocket drive 180 over which is entrained a chain 181. The chain 181 is in turn driven by suitable variable speed motor means (not shown). The important thing to remember is that the cams are each rigidly affixed to the cam shaft so that the entire apparatus will function in a proper sequence, depending upon the relative angular positioning of the various cams and of course their configurated design, without interference from any of the moving parts as these parts are put through their operational cycle.

To illustrate the invention which has been just described in considerable detail, the operation of the apparatus will now be presented. Any number of slugs or work pieces 20 are suitably stored in a hopper (not shown) to which the entrance end of the feed tube 23 is attached and these slugs or work pieces are gravitationally fed through the tube to the bushing 21 in an end to end abutting relation where they are successively picked up by the lever arm 10 which is designed to move each slug 20 from the exit end of the tube 23 into a frontal relationship with the first spindle collet C. Although it is believed obvious, it perhaps should be mentioned that the slugs are introduced into the feed tube in a properly oriented manner, that is, with the socket ends all facing in one direction. Since devices for accomplishing this result are old and well-known, having been employed in machines capable of performing only single cutting operations, no description thereof is believed necessary. It will be seen that the loader cam 27 assures that the lever arm 10 will be actuated at only the proper time because of the way said cam is contoured. Also, it will be observed that the offset 19 of the resilient jaw member 14 rides against the inclined flat 22 of the bushing 21 when the loader cam 27 has caused the rockshaft 11 to move the lever arm 10 into the position shown in Figure 6. The inclined flat 22, of course, cams the resilient jaw member 14 into an open position as shown, thus permitting the foremost slug 20 to enter between the jaw members 12 and 16. The limit screw 35 assures that the gripping end of these jaw members will stop in registry with the exit of the tube 23, and, therefore, the first slug 20 and also those subsequent thereto will readily enter between these jaw members.

Figure 3:
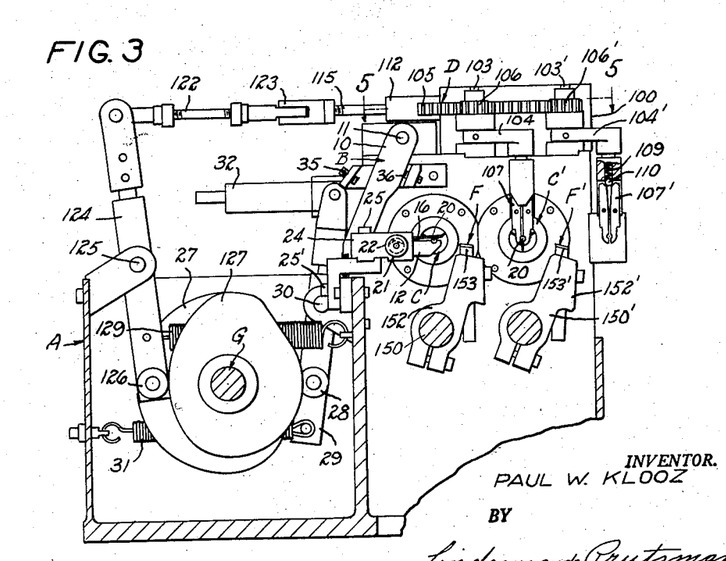
Figure 3 is a sectional view taken in the direction of line 3—3 of Figure 1.

It might be mentioned at this point that adjustment has also been provided for assuring registry of the slug 20 with the first collet C when the lever arm 10 moves into the position shown in Figure 3. This is accomplished by having the jaw member 12 pivotally mounted to the lower end of the lever arm 10, and, by means of adjusting screw 15, the gripping ends of the jaw members 12 and 16 may be raised or lowered in an arcuate path since the spring 14 constantly biases the member 12 in a counterclockwise direction. In this way, the proper vertical adjustment may be made to raise or lower the slugs 20 to the proper elevation for delivery to the collet C. As for obtaining the proper horizontal adjustment, reliance should be made on the limit screw 36 which limits the movement of the lever arm 10 in a counterclockwise direction.

Having made the foregoing adjustment, it is also initially necessary to make sure that the feed tube 23 is at the proper elevation when the lever arm is in a pickup position such as is shown in Figure 6. By reason of the top screws 25 and slots 26 on the bracket 24, the bushing 21 may be moved toward or away from the jaw members 12 and 16, and, by means of the screws 25' at one side of the bracket, the bracket may be raised or lowered until the bushing 21 is in registry with the jaw members 12 and 16. Also cooperating with this adjusting means is the limit screw 35 which is instrumental in stopping the clockwise rotation of the lever arm 10 at the proper angular position for the pickup of the slugs as they emanate from the exit end of the feed tube 23.

It might also be explained in passing that since the slugs 20 are most easily fed by gravity through the tube 23 some means must be provided for preventing the emergence of a slug when the jaw members 14 and 16 are in a position other than a pickup one. From experience it has been found that the side of the rigid jaw member 12 performs such a task very satisfactorily, said side merely grazing the foremost end of the slug that is to be picked up next, while the one ahead is being delivered to the collet C.

Having described the work loader B, the next operational step to be discussed is the functioning of the spindle collets C, C'. Assuming that the lever arm 10 is in the position shown in Figure 3, the collets C, C' must be actuated into an open position for the introduction of one end of the first slug thereinto. Such an open condition of the collets C, C' is obtained automatically by the inherent resiliency of the collet gripping fingers 47, for they cause their inclined faces 50 to bear against the internally tapered face 52 of the finger actuating sleeve 51; and, when the follower arm 75 is permitted to assume the position shown in Figure 1, then there is no force applied on the gripping fingers which would tend to move them into gripping engagement, and the inherent resiliency of these fingers moves the actuating sleeve 51 to the right as viewed in Figure 4. This action is conventional in many collets, and therefore no need is seen for further amplifying the present description on this score.

When the collets C, C' are in their released or open positions, then the first slug 20 may be injected into these collets without interference. Of course, we are dealing only with the first slug, and, therefore, there will be no slug to be introduced into the collet C', for a trimming operation will initially have to be performed on the first slug before it is transferred to the second collet C'. At any rate, the pushers E, E' are normally instrumental in injecting slugs into both of the collets C, C', although at the present moment we are only concerned with the injection of a slug into the collet C. The injection of the first slug 20 is effected by virtue of the promontory 146 on the end cam 145 urging the follower arm 141 in a clockwise direction as viewed in Figure 1. This action overcomes the bias of the spring 140 and causes the plungers 134, 134' to move their reduced ends 135, 135' so that the end 135 abuts the slug 20 and thus pushes it into a position between the collet fingers 46. Sufficient force is applied in this injection step to move the plunger 85 to the right (Figure 4) against the bias of its spring 90, energy thus being stored in the spring 90 for the subsequent ejection for this particular slug 20.

After the slug has been moved into a position where it can be gripped by the collet fingers 47, then it is necessary that these collet fingers be actuated into a positive gripping condition against the slug. This is accomplished by having the promontory 43, which is integral with the cam 81, force the crosshead 74 in a forward direction thereby causing the key 73 to move the actuating collar 64, 64' in a direction to force the balls 63 inwardly. The movement of the balls 63 inwardly in turn causes the movable collar 55 to be advanced toward the collet cap 44 and such advancement carries with it a positive movement of the transfer sleeve 58 which causes the finger actuating sleeve 58 to have its internally tapered surface 62 bear against the inclined face 50 on the gripping fingers 47 of the collet. In this manner, the spring fingers 47 are flexed radially against the slug 20 to thereby tightly grip said slug.

Having gripped the first slug 20, the cutters F, F' come into play, although only the first cutter F will perform an actual work operation at this time for no slug as yet has been introduced into the collet C'. The cams 60 and 61 are so designed that the follower arms 156, 156' will be moved sufficiently to cause the rock-shafts 150, 150' to move the cutting tools 153, 153' against the various slugs as they are held in the collets C, C'; however, as already stated, only a slug 20 is held by the collet C, and, therefore, just the cutting tool 153 effects a cutting operation on the first operational cycle of the machine.

As shown, the cams 160, 160' are identical, but it will be seen that 160', for example, could have a different contour and that such contour could cause a greater rocking action of the rockshaft 150' than that of the rockshaft 150. Owing to this possibility, a greater bevelled cut or trim could be performed with the cutting tool 153' when a slug 20 is held by the collet C'. Also, the nature of the cut by the tool 152' may be modified by changing the cam 176 which carries on one of its faces the promontory 177 which is instrumental in determining the amount of pivoting of the follower arm 173, a large promontory 177 causing the pin 172 to move the collar 171 a greater distance than if a smaller promontory 177 is utilized. By reason of the fact that the collar 171 is integral with the rockshaft 150', it will be apparent that the tool 153' is advanced longitudinally a greater amount if the promontory 177 is fairly large than would be the converse if only a small promontory or no promontory at all were used.

Thus if a cone point screw is to be produced, then the cam 160' would be designed to produce a relatively large amount of rocking of the shaft 150' so that the tool 153' will cut to the center of radius of the slug 20. On the other hand, if a dog screw or half dog screw is to be manufactured, the cam 160' would be contoured so as to cause the tool 153' to cut in a radial direction less than the full radius, but the cam 176 would be equipped with a promontory that would overcome the spring 151' sufficiently to cause an axial shift of the rockshaft 150' to the extent necessary to produce the desired length of dog.

Upon completion of the first cutting or trimming operation, it is then essential that the collet fingers 47 be released so that the slug 20 contained therein may be removed. As previously stated, the resiliency of the spring fingers 47 themselves is instrumental in causing the actuating sleeve 51 to be moved to the right as in Figure 4. Since the ejector tip 86 is abutting against the inner end of the slug 20, and, as heretofore mentioned, the spring 90 is compressed by the pusher E when it injected the slug into the collet E, the spring 90 automatically causes the ejector tip 86 to shove the slug outwardly and thus eject the slug from the collet C. However, the cam pattern is so arranged that the transfer carrier D has now been actuated so that the lever arm 104 is in registry with the collet C and the ejection of the slug from the collet C results in the introduction of said slug immediately into juxtaposition between the tongs or fingers 107.

The actual transfer is, of course, precipitated by the transfer cam 127 which causes the rack 105 to rotate the pinions 103, 103' in a clockwise direction so that the lever arm 104 is moved from a frontal relationship with the collet C to a corresponding frontal relationship with the collet C'. During this oscillatory movement of the arm 104, it will be seen that the slug 20 contained between the fingers 107 is reversed so that the end which remained exposed while it was held by the collet C is then adjacent the collet C'. In this way, the pusher E' will function to inject the trimmed end of the slug 20 into the collet C'. Simultaneously, while this is happening, the work loader B supplies a second slug to the collet C so that when the pushers E, E' are concomitantly actuated both the new slug and the slug which has already received its first trimming operation will be injected into the collets C, C'. The cutters F, F' then perform a dual cutting operation after the slugs have been tightly gripped between the collets C, C', the cutting tool 153, of course, engaging the new or second slug 20 while the cutter 153' engages the opposite end of the first slug 20.

After the double cutting operation has been performed, then the two slugs are simultaneously ejected from the collets C, C', the first slug then being received between spring fingers 107' of the lever arm 104', and, then while the second slug is being transferred from the collet C to the collet C', the first slug 20 is being transferred from the collet C' to the stationary ejector 111 which causes the first slug to be removed from the lever arm 104', such removal causing the slug to merely drop downwardly into a suitable receptacle. In this way, there is no intermixing of the slugs with the shavings, for the shavings are of course permitted to fall directly downward from the collet C' and the cutter F', whereas the slugs are transferred to the laterally displaced ejector 111, thereby avoiding any need for separating the slugs from the shavings or chips. This process, of course, is repeated until the complete batch of slugs has been subjected to the double-ended cutting operations that are desired to be effected in the particular apparatus which has been selected for purposes of description.

It might be brought out at this time that in some instances the slugs 20 will be longer than in other instances, although any given batch of slugs should be all the same length. Provision is made for the accommodation of various sizes of slugs 20 by means of the base plate 100 which may be moved longitudinally toward or away from the front of the apparatus by means of the slots 101 and the screws 102. If the slugs are of longer length than that which the base 100 is shown adjusted for, then the base 100 will be merely moved forward so that the gripping fingers 107, 107' will engage each slug at approximately its midpoint. Mention has already been made relative to the adjustable feature for modifying the depth of cut produced by the cutters F, F'. Thus it will be seen that my machine is apposite for handling work of different sizes and that the work operations themselves may be altered to suit the particular order being processed.

In conclusion, it will be seen that a machine within purview of this invention is especially suited for mass producing articles that may be of relatively small size and which would otherwise be difficult to handle. Further, it will be seen that the production rate is enhanced appreciably by performing work operations on opposite ends of two different articles or work pieces at one time, production speeds in excess of sixty articles per minute being possible and feasible. Still further, no time is lost in reversing the work pieces, as this is accomplished during the period that the articles are being transferred from one collet to the other. Still further, the slugs are never mixed with the shavings and the task of separating the slugs from such shavings, as heretofore done, is obviated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. Apparatus for performing a trimming operation on each end of a series of elongated articles comprising first and second chuck means for successively holding the articles, a cam shaft, an oscillatable work loader, first cam means on said cam shaft for periodically actuating said work loader for moving an article into registry with said first chunk means, pivotal means for transferring and reversing each article from the first chuck means into registry with said second chuck means, second cam means on said cam shaft for causing registry of said transfer means with said first chuck means when said work loader is out of registry therewith and registry with said second chuck means when said work loader is in registry with said first chuck means, respective pusher means for injecting articles held in registry with said two chuck means into said two chuck means, third cam means on said cam shaft for actuating the respective pusher means when said work loader and said transfer means are in respective registry with said first and second chuck means, respective cutter means associated with each chuck means, fourth cam means on said cam shaft for actuating said respective cutter means into cutting engagement with said injected articles to perform a trimming operation on different ends of said articles, respective ejecting means for ejecting the articles from said two chuck means, and fifth cam means on said cam shaft for actuating said respective ejecting means after the articles have been trimmed and when said transfer means is in registry with said first chuck means so that the article ejected from said first chuck means will be received by said transfer means for subsequent transfer into registry with said second chuck means.

2. Apparatus for trimming each end of a series of elongated articles comprising first and second chucks for holding the articles, a cam shaft, an oscillatable work-loader, a supply cam on said cam shaft for periodically actuating said work-loader between a supply station and said first chuck, pivotal transfer means for transferring and reversing each article from the first chuck into registry with the second chuck, respective pusher means for injecting into said two chucks articles held in registry therewith, a pusher cam on said cam shaft for simultaneously actuating said respective pusher means after said work-loader and said transfer means are advanced to respective registry with said first and second chucks, respective cutter means associated with each chuck, cutter cams on said cam shaft for actuating said respective cutter means into cutting engagement with said articles after injection thereof into said chucks, whereby a cutting operation on different ends of said articles is performed, respective ejecting means for ejecting the articles from said two chucks, an ejector cam on said cam shaft for actuating said respective ejecting means immediately after completion of said cutting operation, and a transfer cam on said cam shaft for advancing said transfer means from said first chuck to said second chuck immediately after said ejection and for returning said transfer means from said second chuck to said first chuck prior to the end of the next cutting operation.

3. Apparatus for performing a trimming operation on each end of a series of elongated articles comprising first and second chuck means for successively holding the articles, a cam shaft, an oscillatable work loader, first cam means on said cam shaft for periodically actuating said work loader for moving an article into registry with said first chuck means, first pivotal transfer means for transferring and reversing each article from the first chuck means into registry with said second chuck means, second pivotal transfer means for transferring each article from said second chuck means to a point of discharge, second cam means on said cam shaft for causing registry of said first transfer means with said first chuck means and registry of said second transfer means with said second chuck means when said work loader is out of registry with said first chuck means and registry of said first transfer means with said second chuck means and registry of said second transfer means with said point of discharge when said work loader is in registry with said first chuck means, respective pusher means for simultaneously injecting articles held in registry with said two chuck means into said two chuck means, third cam means on said cam shaft for actuating the respective pusher means when said work loader and said first transfer means are in respective registry with said first and second chuck means, respective cutter means associated with each chuck means, fourth cam means on said cam shaft for actuating said respective cutter means into cutting engagement with said injected articles to perform a trimming operation on different ends of said articles, respective ejecting means for ejecting the articles from said two chuck means, fifth cam means on said cam shaft for actuating said respective ejecting means after the articles have been trimmed and when said first transfer means is in registry with said first chuck means so that the article ejected from said first chuck means will be received by said first transfer means for subsequent transfer into registry with said second chuck means and the article ejected from said second chuck means will be received by said second transfer means for subsequent transfer to said point of discharge, and discharge means comprising a stationary ejector adapted to engage an article received by said second transfer means as said second transfer means is pivoted from said second chuck means to said point of discharge to disengage said article from said second transfer means.

4. Apparatus for performing a trimming operation on each end of a series of elongated articles comprising first and second chuck means for successively holding the articles, a cam shaft, an oscillatable work loader, first cam means on said cam shaft for periodically actuating said work loader for moving an article into registry with said first chuck means, pivotal transfer means for transferring and reversing each article from the first chuck means into registry with said second chuck means, second cam means on said cam shaft for causing registry of said transfer means with said first chuck means when said work loader is out of registry therewith and registry with said second chuck means when said work loader is in registry with said first chuck means, respective pusher means for simultaneously injecting articles held in registry with said two chuck means into said two chuck means, third cam means on said cam shaft for actuating the respective pusher means when said work loader and said transfer means are in respective registry with said first and second chuck means, means on said second cam means to position said transfer means intermediate said first chuck means and said second chuck means following actuation of said pusher means, respective cutter means associated with each chuck means, fourth cam means on said cam shaft timed to actuate said respective cutter means into cutting engagement with said injected articles upon positioning of said transfer means intermediate said first and second chuck means to perform a trimming operation on different ends of said articles, means on said second cam means to position said transfer means in registry with said first chuck means subsequent to said trimming operation, respective ejecting means for ejecting the articles from said two chuck means, and fifth cam means on said cam shaft for actuating said respective ejecting means after the articles have been trimmed and when said transfer means is in registry with said first chuck means so that the article ejected from said first chuck means will be received by said transfer means for subsequent transfer into registry with said second chuck means.

5. A trimming machine comprising first and second rotatable chucks mounted in side-by-side relationship, means for rotating the chucks, a cam actuated work loader movable between an article receiving supply station and a position in registry with said first chuck, a cam actuated transfer arm having means for holding a workpiece mounted for swinging movement between a first position with the workpiece holding means in front of the first chuck and a second position with the workpiece holding means in front of the second chuck, cam actuated pusher means movable axially of the chucks for transferring workpieces from said work loader and transfer arm into said first and second chucks respectively, cam actuated retaining means on said chucks to hold a workpiece inserted by said pusher means, a cam actuated first trimming tool mounted for pivotal movement into cutting engagement with a workpiece in said first chuck, a cam actuated second trimming tool mounted for pivotal and translational movement into cutting engagement with a workpiece in said second chuck, cam actuated means for ejecting workpieces from said chucks, and simultaneously driven rotating cams associated respectively with each of said cam actuated elements and timed with respect to each other to provide a complete cycle of operation of said cam actuated elements in one revolution of said cams.

6. Apparatus for performing a trimming operation on each end of a series of elongated articles comprising first and second chuck means for successively holding the articles, a cam shaft, an oscillatable work loader having a selectively variable stroke, first cam means on said cam shaft for periodically actuating said work loader for moving an article into registry with said first chuck means, means resiliently connecting said first cam means and said work loader to provide for variations in the stroke of said work loader, pivotal transfer means for transferring and reversing each article from the first chuck means into registry with said second chuck means, second cam means on said cam shaft for causing registry of said transfer means with said first chuck means when said work loader is out of registry therewith and registry with said second chuck means when said work loader is in registry with said first chuck means, drive means comprising a drive piston and spring loaded drive cylinder yieldably connecting said second cam means and said transfer means, respective pusher means for simultaneously injecting articles held in registry with said two chuck means into said two chuck means, third cam means on said cam shaft for actuating the respective pusher means when said work loader and said transfer means are in respective registry with said first and second chuck means, respective cutter means associated with each chuck means, fourth cam means on said cam shaft for actuating said respective cutter means into cutting engagement with said injected articles to perform a trimming operation on different ends of said articles, respective ejecting means for ejecting the articles from said two chuck means, and fifth cam means on said cam shaft for actuating said respective ejecting means after the articles have been trimmed and when said transfer means is in registry with said first chuck means so that the article ejected from said first chuck means will be received by said transfer means for subsequent transfer into registry with said second chuck means.

7. Apparatus for performing a trimming operation on each end of a series of elongate articles comprising spaced first and second chuck means extending in substantially the same direction for successively holding the article, an oscillatable work loader, first cam means on said cam shaft for periodically actuating said work loader for moving an article into registry with said first chuck means, pivotal transfer means for transferring and reversing each article from the first chuck means into registry with said second chuck means, second cam means on said cam shaft for causing registry of said transfer means with said first chuck means when said work loader is out of registry therewith and registry with said second chuck means when said work loader is in registry with said first chuck means, respective pusher means for simultaneously injecting articles held in registry with said second chuck means into said second chuck means, third cam means on said cam shaft for actuating the respective pusher means when said work loader and said transfer means are in respective registry with said first and second chuck means, said first and second chuck means each comprising a pair of spaced collars having oppositely inclined adjacent sides forming a tapered groove, a plurality of balls in each group, a cylindrical collar having a tapered recess encircling each pair of tapered collars and said balls, said cylindrical collars being movable axially of said chucks to wedge said balls inwardly and displace one collar of each pair axially, a wedging sleeve on each chuck adapted to close said chuck to gripping position responsive to axial displacement of said one collar, fourth cam means on said cam shaft for actuating said cylindrical collar of both chuck means to close said chuck means subsequent to the injection of an article into said chuck means, respective cutter means associated with each chuck means, fifth cam means on said cam shaft for actuating said respective cutter means into cutting engagement with said injected articles to perform a trimming operation on different ends of said articles, sixth cam means on said cam shaft for actuating said cylindrical collar of both chuck means to move said wedging sleeve to a nongripping position subsequent to said trimming operation, respective ejecting means for ejecting the articles from said second chuck means, and seventh cam means on said cam shaft for actuating said respective ejecting means after the articles have been trimmed and when said chuck means is in registry with said first chuck means so that the article ejected from said first chuck means will be received by said transfer means for subsequent transfer into registry with said second chuck means.

References Cited in the file of this patent

UNITED STATES PATENTS

| | | |
|---|---|---|
| 564,355 | Witherell | July 21, 1896 |
| 640,029 | Richards | Dec. 26, 1899 |
| 1,542,428 | Watrous | June 16, 1925 |
| 1,779,529 | Brophy | Oct. 28, 1930 |
| 2,048,331 | Geist | July 21, 1936 |
| 2,100,028 | Frayer | Nov. 23, 1937 |
| 2,400,183 | Wilson | May 14, 1946 |
| 2,542,864 | Friedman | Feb. 20, 1951 |

FOREIGN PATENTS

| | | |
|---|---|---|
| 39,546 | Austria | June 15, 1909 |